Figure 14:
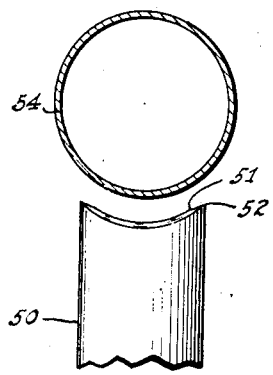

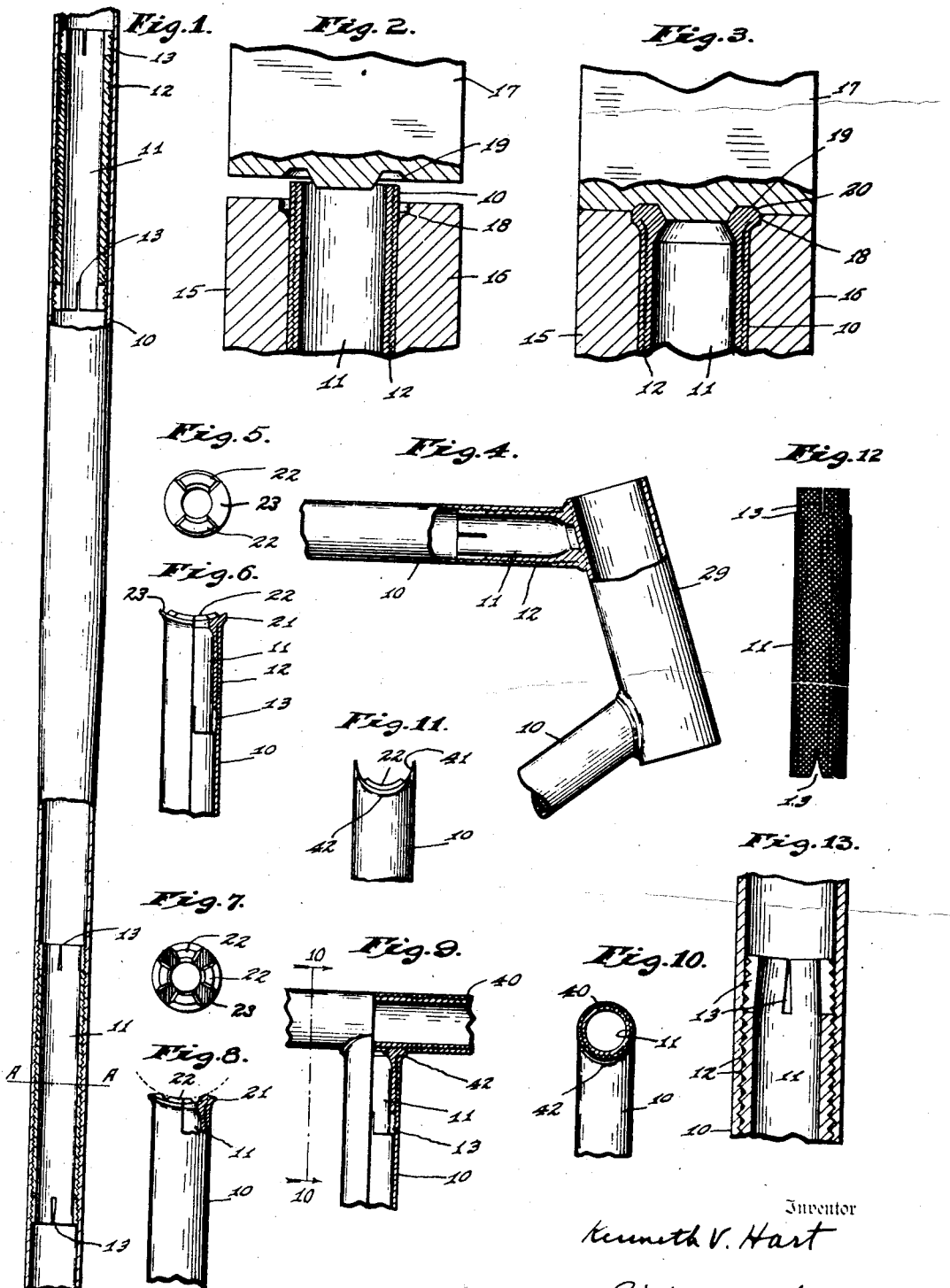

Sept. 7, 1937.  K. V. HART  2,091,982

METHOD OF MAKING WELDED TUBE JOINTS

Filed March 13, 1936  4 Sheets-Sheet 2

Inventor
Kenneth V. Hart,
By
Attorneys

Sept. 7, 1937.     K. V. HART     2,091,982
METHOD OF MAKING WELDED TUBE JOINTS
Filed March 13, 1936     4 Sheets-Sheet 3

Inventor
KENNETH V. HART,
By _____
Attorneys

Sept. 7, 1937.　　　　　K. V. HART　　　　　2,091,982
METHOD OF MAKING WELDED TUBE JOINTS
Filed March 13, 1936　　　　4 Sheets-Sheet 4
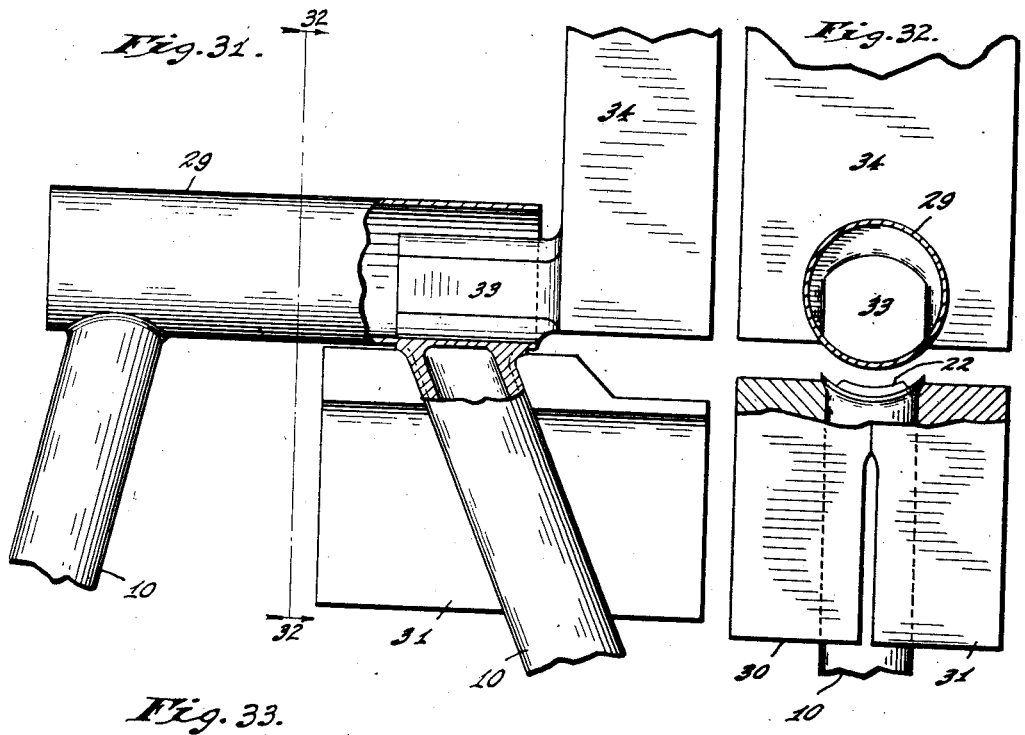
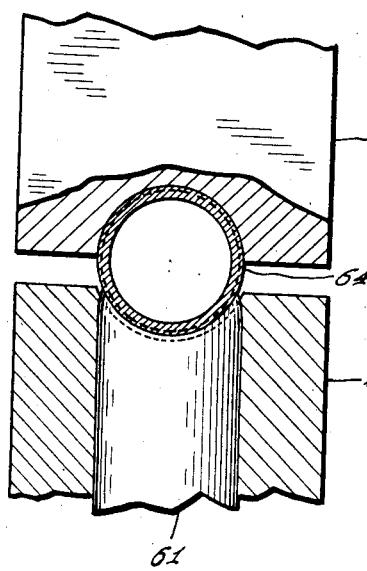
Inventor
KENNETH V. HART,
By
Attorneys Patented Sept. 7, 1937

2,091,982

UNITED STATES PATENT OFFICE 2,091,982

METHOD OF MAKING WELDED TUBE JOINTS

Kenneth V. Hart, South Bend, Ind.

Application March 13, 1936, Serial No. 68,785

20 Claims. (Cl. 219—10)

This invention relates to the manufacture of articles of tubular construction, and especially to a method of forming welded joints between pieces of tubing.

It is an object of my invention to increase the usefulness of structural tubing in the fabrication of various articles, by providing a simple and inexpensive method of forming effective joints between pieces of such tubing, and to make possible a reduction of weight in the fabricated article by preferably reinforcing such joints so that adequate strength may be secured with lighter tubing. It is more especially an object to provide a method of forming, by resistance welding, joints between a tube-end and another part, particularly the side of another tube, which method will be rapid and suitable for commercial use, and will minimize the occurence during the welding of change in the characteristics and appearance of the metal at and near the weld, to preserve the strength of the tubing and to permit the tubing to be given substantially its final finish before the joints are made; and to reinforce the tubing, preferably by the use of tubular inserts, in a manner which will co-operate in the joint-forming operation to facilitate it, and will strengthen the resulting joints and distribute strain away from the weld to give resiliency to the joints. It is a further object to provide for the formation of effective joints of adequate strength by welding mainly with the metal of the reinforcing inserts so that joints may be formed between tubes of difficulty weldable material by using reinforcing inserts of suitable material.

My method may be used with tubing of many kinds and of many different materials, including any metallic material which is capable of being resistance welded. For example, the tubing used may be of circular, elliptical, or square cross section, and may be of low, medium or high carbon steel, alloy steel, or stainless steel, of aluminum, or aluminum alloys. It may be seamless tubing, or gas or electrically welded tubing.

In its preferable form, my method of forming joints between an end of a piece of structural tubing and another part comprises three main steps. In the first step, which may sometimes be omitted, I increase the body of the tubing at those parts which will be used in the joints, conveniently by the use of tubular inserts or by upsetting; in the second step, I suitably shape a tube-end; and in the third step I weld such shaped tube-end to another part.

The increase in body of the tubing may be accomplished by any suitable method, such as by upsetting or preferably by inserting tubular reinforcements.

The purpose of increasing the body of the tubing is to produce a tube-end of sufficient cross sectional area to accomplish the subsequent joint welding operation, and to increase the strength of the tubing at the joint. I prefer to do this by reinforcing the tubing at desired locations with an insert which has a roughened surface of which the raised parts are embedded in the surface of the tubing. This preferred method is advantageous because it provides a tube-end made up of concentric laminations, which are interconnected with a good physical and a good electrical bond but with a relatively poor thermal interconnection, so that the laminations will not slip, will readily conduct electricity from one to the other, but will retard the flow of heat from one to the other.

However the body of the tubing is increased, it is desirable also to avoid localization of strain at the ends of the portions which have their body increased or are thickened; and I may accomplish this in the upset method of thickening by gradually decreasing the amount of thickening at the end of the thickened portion, or in the method which uses tubular reinforcements by gradually diminishing the amount of reinforcement at the ends of the inserts, as by slotting or tapering the ends of such inserts. Where the inserts are located at intermediate points in the tubing, the reinforced tubing may then be cut at the centers of some or all of the inserts, to give structural elements of suitable length, with reinforcements at one or both ends and at such other points as may be desired. The tube-ends of increased body, are then suitably shaped for use in the later joint-welding operation.

The step of shaping the tube-ends may be accomplished either by an upsetting method, or by a machining operation.

Shaping is for the purpose of forming an end conformation which provides quantities of metal of suitable conformation and location for use in the welding operation, and which has a base-surface that will fit the surface to which the tube-end is to be welded. These quantities of metal are shaped to provide between the tube-end and the part to which it is to be welded an initial contact area which is preferably a narrow contact and in any event is of considerably less area than the cross sectional area of the tube-end, and which is located radially inwardly from the outside surface of the tube-end, to avoid disturbing such outer surface and to minimize the extrusion of weld- or flash-metal past the edge of the base-surface during the welding. The shape of the quantities of weld-metal is desirably in the general form of a continuous annular ridge or bevel on the end base-surface, preferably to provide a circumferentially complete line contact-area, but the continuity of such ridge may be broken, so that such weld-metal takes the form of a series of angularly spaced segments or lugs, with portions of the base-surface exposed between them. Non-contacting parts of the end surface are so shaped as to be spaced a short distance from the opposed surface when the parts are in initial contact. This distance is so small that the parts can move toward each other and substantially close the space or gap during the welding operation.

In the welding operation a shaped tube-end and the cross tube or other part to which it is to be welded are positioned so they engage each other over the small contact area provided by the shaping, and are strongly pressed together in such a way that as the gathered metal which initially separates the base-surface of the tube-end from the other part is fused the parts will immediately and continuously follow up the fusing of such gathered metal and move toward each other. A practically instantaneous welding current is then passed between the parts. Welding occurs practically instantaneously, and usually with explosive speed and the discharge of small particles of molten metal as sparks.

Good welds may be formed by this process without materially disturbing the appearance or shape of the outside surfaces of the joint, so that the tubing may be given substantially its final finish before the pieces are joined. Further, this process substantially avoids the extrusion of weld- or flash-material about the edges of the weld, and limits any such extrusion which may occur to a thin sheet-form which is readily removable.

In the joints made by this method, the exterior surface of the tube-end extends smoothly to the surface of the part to which it is welded, so that the joints will normally have substantially a finished appearance as they come from the welding operation.

For convenience, I speak of my invention throughout this specification and illustrate it in the drawings as applied to tubes of circular cross-section; but the ideas expressed will generally apply also to tubes of other cross-sectional shape.

Figure 15:
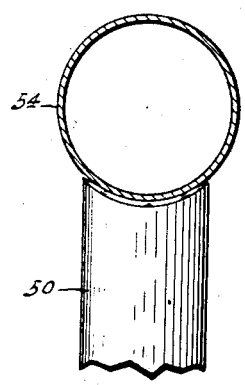
Figure 16:
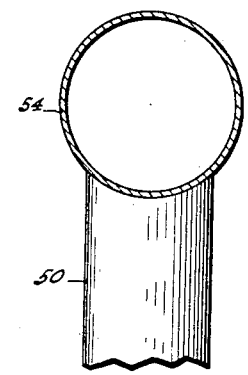
Figure 17:
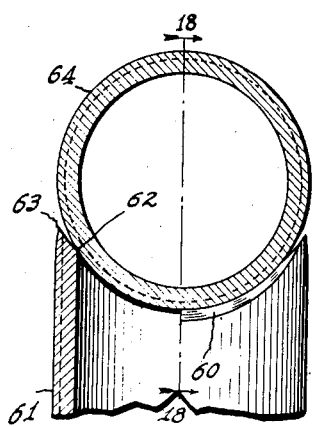
Figure 18:
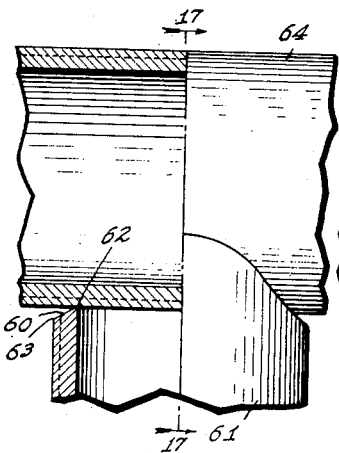
Figure 19:
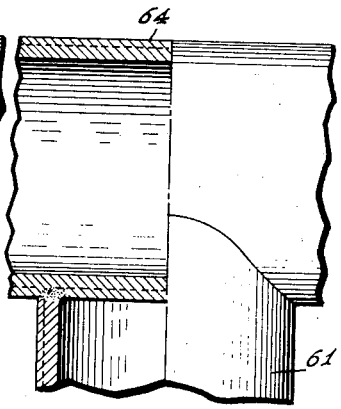
Figure 20:
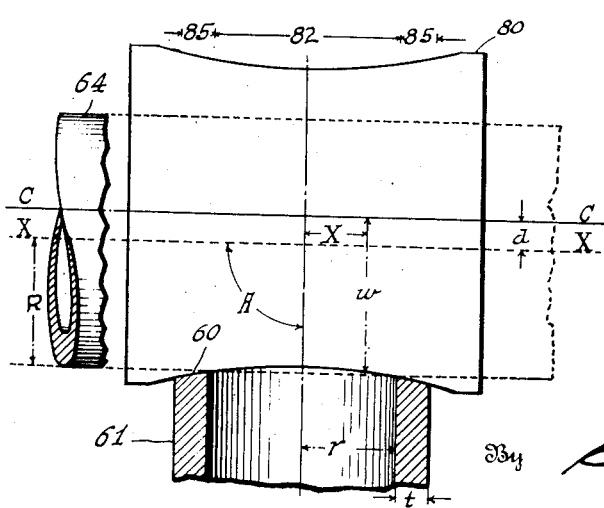
Figure 21:
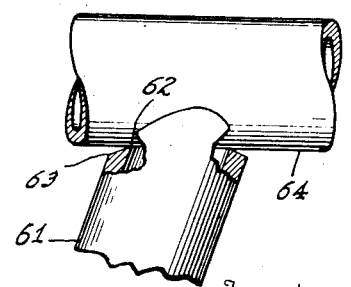
Figure 22:
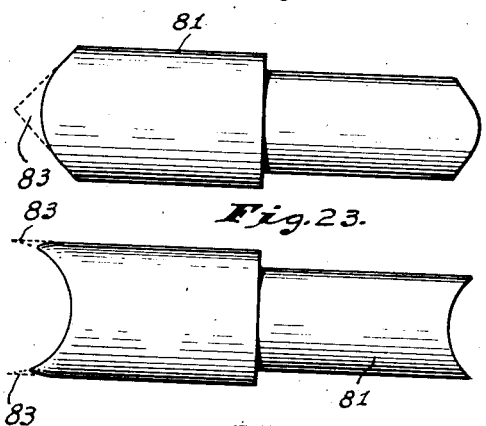
Figure 24:
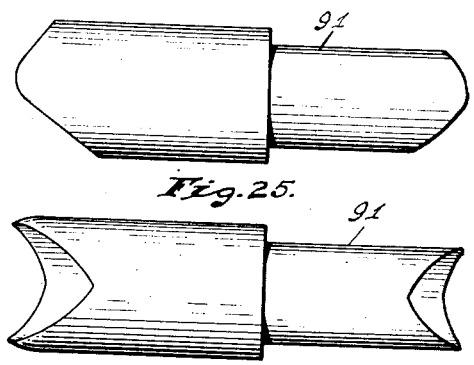
Figure 23:
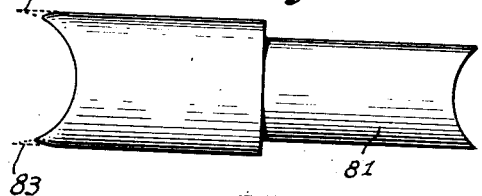
Figure 25:
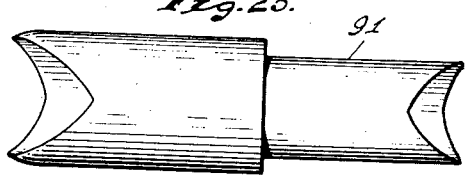
Figure 30:
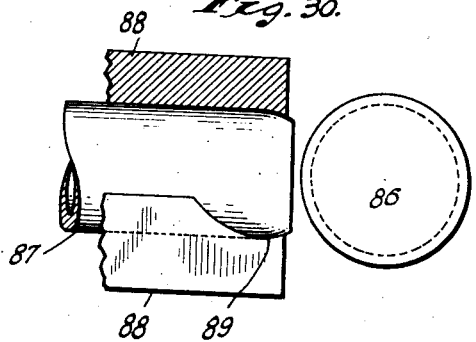

The accompanying drawings illustrate my invention: Fig. 1 is a fragmentary side elevation of a section of tubing, with parts broken away to show two reinforcing inserts in place, the upper and lower portions respectively of the figure showing conditions which exist at different points in one form of reinforcing; Figs. 2 and 3 show somewhat diagrammatically a set of upsetting dies, in open and closed positions respectively, for upsetting or forging tube-ends to give them a desired end-conformation; Fig. 4 shows a welded structure, with two welded joints made with laminated tube-ends that have been shaped by upsetting, the upper joint being broken away to show such joint in section; Fig. 5 is an end elevation of a tube-end shaped by upsetting and ready for welding to another tube, with two lugs of gathered weld-metal; Fig. 6 is a side elevation of the tube-end shown in Fig. 5, with parts broken away to show a wall in section; Fig. 7 is a view similar to Fig. 5, but showing a tube-end with four lugs; Fig. 8 is a side elevation of the tube-end shown in Fig. 7; Fig. 9 is a side elevation of a T-joint between laminated tubes of like diameter, with parts broken away and shown in section; Fig. 10 is a section on the line 10—10 of Fig. 9; Fig. 11 is an elevation of the upset tube-end used in the joint of Fig. 10; Fig. 12 is a side elevation of one form of reinforcing insert, showing a knurled outer surface, and modified slot arrangements at its ends; Fig. 13 is an enlarged section of a reinforced tube, showing the end of an insert and how the slots permit the insert to be reduced in size in the slotted portion of its length to progressively decrease at the end of the insert the reinforcement which such insert gives; Fig. 14 shows in side-elevation a tube-end which has been shaped by machining, and in section a larger tube to which such tube-end is to be welded, with the two tubes shown in the related positions they take just before they are brought together for welding; Fig. 15 shows the same tubes as Fig. 14, but in the positions they take just before welding starts; Fig. 16 is a view similar to Figs. 14 and 15, but showing the two tubes after the weld is completed; Figs. 17, 18, and 19 are three views of a pair of similarly sized tubes in positions they take before and after they are welded, Fig. 17 being a section on the line 17—17 of Fig. 18, and Fig. 18 being a section on the line 18—18 of Fig. 17, with both views showing the tubes in the position they take just before welding starts, and Fig. 19 being a section similar to Fig. 18, but showing the parts after welding; Fig. 20 illustrates diagrammatically the general form of a milling cutter for use in shaping tube-ends, Fig. 21 shows a pair of tubes in before-welding position for an acute-angle joint, with parts broken away to show the walls of the tube-end in section; Figs. 22, 23, 26, and 28 illustrate various steps in a method of forming a cutter for a right angle joint; Figs. 24, 25, 27, and 29 illustrate similar steps in a method of forming a cutter for an acute-angle joint; Fig. 30 illustrates the method of using a cutter, and shows a form of clamps for use in such method; Figs. 31 and 32 show respectively, in before and after welding positions, a set of electrodes for making a joint weld where the joint is made between a reinforced tube-end which has been shaped by upsetting, and a larger tube of sufficient diameter to permit the use of an electrode shoe inside such larger tube, Fig. 32 being a section on the line 32—32 of Fig. 31, and Fig. 33 is a section of a set of electrodes in after-welding position which may be used for welding a joint between tubes of similar diameter, and where the tube-end is shaped by machining.

My method of tubular construction may be used with unreinforced tubing if it is of sufficiently heavy gage, but is desirably used with tubing of lighter gage which has had its body suitably increased or thickened, either by upsetting or by lamination. Desirably, therefore, the making of a thickened tube-end thus forms the first main step of my method, and I prefer to do this by applying tubular laminations or inserts, and have illustrated one convenient method in Fig. 1. As shown in the upper part of Fig. 1, I may slip within a tube 10 of slightly greater size than is desired in the final part one or more tubular reinforcing inserts 11. At least one of the engaging surfaces, between the reinforcing insert 11 and the tube 10, and conveniently the outer surface of the insert 11, is knurled or otherwise roughened, preferably in a manner which will produce projecting ridges or points 12. The inserts 11 may be provided at their ends with slots 13. Several of these inserts 11 may be placed in a single length of tubing 10, and are located at points where it is desired to have extra strength, as at the ends, or where it is intended to cut the tube 10 to provide structural parts of proper length and to have reinforced ends on such parts. These several inserts are suitably held in the desired positions, and the whole tube 10 is hammered or pressed to reduce it to the desired size (shown in the lower part of Fig. 1) and to form a good physical bond and a good electrical contact between the tube and insert by embedding the points 12 on the insert in the inner surface of the tube 10. This operation may even reduce the size of the insert itself. The points 12 may not be completely embedded, however, for the presence of some air space at the bases of such points 12, as is shown in Fig. 13, is desirable to lessen heat transfer from the insert to the tube. The adjacent surfaces of the tube and insert should be clean and free of scale or other poorly-conducting substance, to permit the embedding of the points 12 to make a good electrical contact between the tube and insert.

This method of reinforcement gives a good bond between the tube and insert over the greater part of the length of the insert, but at the ends thereof, as shown in Fig. 13, where the slots 13 permit the insert to yield slightly, the bond becomes progressively less tight, and the penetration of the points 12 into the surface of the tube 10 is progressively less until at the very end there is only very little if any penetration. The progressively decreasing bond thus produced at the ends of the reinforcements and the presence of the slots themselves will distribute the load stresses at such ends and prevent the localization of such stresses at the joint in the tube 10.

When the tubing has been reduced in size, it is cut to the desired lengths as on the line A—A. The cuts may be curved or straight, and may be either at right angles to the axis of the tube 10 or at an angle thereto, depending upon the characteristics of the joint which will be made from the ends produced by such cutting.

Tube-ends of suitable body may also be produced by an upsetting or forging operation similar to the process described below for shaping by upsetting, and where the thickening and shaping are both to be done by upsetting, they may be done in a single operation. Tube-ends thickened by lamination may also be produced by other methods than the one just described. For instance, roughened tubular inserts may be slipped in a tube and expanded, or pressed in the end of a tube, to reinforce such end; or the inside of the tube may be roughened, and smooth inserts applied.

The second main step in my process is the proper shaping of tube-ends to produce the desired conformation for the welding operation. Although many of the drawings illustrate this step as using tube-ends thickened by the use of tubular inserts, it is to be understood that the description will generally apply to any tube-ends of suitable thickness.

Shaping may be done either by an upsetting operation or by a machining operation.

The upsetting operation may be done by forging the tube-end to the desired conformation, preferably in electrode-dies. In this operation I have used a standard resistance-welding machine, which has a fixed lower electrode holder, and an upper electrode holder movable toward such fixed electrode holder by mechanism which includes some means such as a spring to press the upper electrode holder toward the lower electrode with a high pressure.

In using this machine for the tube-end upsetting operation, as is illustrated in Figs. 2 and 3, a tube-end is placed between jaws 15 and 16, which together form the lower electrode and are carried by the lower electrode holder and which meet at the sides of the tube with not more than a few thousandths of an inch clearance. The two jaws 15 and 16 are electrically interconnected and their upper surfaces are cut out around the tube to form a die-cavity 18. Above these die-forming jaws 15 and 16, is a movable electrode-die 17 carried by the upper electrode holder and provided with a die-cavity 19. The jaws 15 and 16, and the upper electrode-die 17 may be made of copper, or of copper alloys such as those used for welding electrodes; and may be associated with means for cooling them, as for example by providing them with passages for cooling water.

The position of the tube-end in the die-forming jaws is such that sufficient metal is provided above the jaws to substantially fill the impression of the die-cavities 18 and 19 when it is upset and the dies are closed. To perform the upsetting operation, the die 17 is brought down against the end of the tube 10 with a relatively high pressure, and a welding current is passed between the electrodes and through the material of the combined tube and insert. This current softens the extreme end of the tube to such an extent that the pressure on the die 17 is enabled to close that die 17 against the die formed by the jaws 15 and 16, and to forge the tube-end to the shape of the die cavities 18 and 19. Where laminated tube-ends are used, the upsetting current also at least partially welds the ends of the tube and insert together. The current is closely controlled so that its application will occur within a short period of time which may end before the die 17 completes its downward stroke. Its characteristics, the time and extent of its application, and the pressure on the upper die-electrode 17 are interrelated, to give the desired smooth configuration and body on the tube-end, and vary with the characteristics and size of the tubing and insert. The particular current and pressure used, and the manner of their application will necessarily be determined by some experimentation, but may follow in general the example hereinafter set forth.

The upsetting operation makes possible a variety of end-designs such as those including various shapes of beads 21, for use either by themselves or around joints. Essentially, however, this shaping by upsetting forms an end-conformation suitable for the joint-welding operation, which comprises a basic end-surface 23 shaped to substantially fit the part to which the tube-end is to be welded, with quantities of raised weld-metal on and projecting above such end-surface 23. The weld-metal may be in the form of two or more lugs 22, which leave segments of the end-surface 23 exposed; or the ring of lugs 22 may be continuous so that the weld-metal is in the form of a bevel or ridge similar to that formed by the machining operation described later. It should be shaped to engage the part to which the tube-end is to be welded with a contact-area which is relatively small. It is preferable to have not more than substantially a narrow contact, but where an especially heavy weld is desired, a somewhat greater contact area may be used, such as that provided in the lugs 22 of Figs. 5 and 6. The weld-metal, whether it is in the form of lugs 22 or a bevel or ridge, desirably increases progressively in cross-sectional area toward the basic end-surface 23; and the contact-area provided by such weld-metal should preferably be located inwardly from the outer circumferential edge of the end-surface 23. While the bead 21 is largely decorative, it also serves to widen the base-surface of the tube-end, to permit the weld to extend over a greater area, and when heavy tubing is used, it may be used alone to thicken the tube-end, and to give a wide weld area, so that the weld may be commensurate with the strength of the tubing. As is shown in Figs. 7 and 8, where the raised metal is in the form of four lugs 22, both the contact-area at the ends of the raised weld-metal and the base-surface 23 are shaped to substantially fit the surface (shown in dotted line) of the tube or other part to which the tube-end is to be welded; and the small contact-area between the ends of lugs 22 and such (dotted line) surface is located inwardly from the outer edges of the base-surface 23.

With the use of lugs 22, the raised weld-metal may be located circumferentially of the tube in any desired position, to locate the subsequently formed weld in a similar desired position. Thus, as is shown in Fig. 11, where the base-surface 41 is formed to fit a cross-tube 40 of the same size as the tube 10, the two lugs 22 may be located at the bottom of the concave end-surface 41, so that welding will occur mainly in that vicinity and will be avoided at the thin upper edges of the tube 10. It may be noted also from Fig. 11 that a bead 42 may be formed which is of full thickness only at the bottom of the concave end-face 41 and diminishes in thickness until it completely fades out at the extreme end of the tube.

The machining method of shaping tube-ends is of special usefulness where it is desired to shape the tube-end to give a circumferentially continuous ridge of weld-metal on its end, and to have the initial contact a narrow contact between the parts, as is illustrated for right angle joints between tubes of different sizes in Figs. 14 and 15, and between tubes of the same size in Figs. 17 and 18; and for an acute angle joint between tubes of the same size in Fig. 21. In a desirable end-conformation of this sort, the base-surface is substantially entirely covered, and the contact area is small, conveniently disposed at the inner circumferential edge of the tube-end. As is illustrated in Figs. 17 to 19, both this contact area 62 and the outer circumferential edge 63 of the desirable end-face are shaped to fit the surface to which the tube-end is to be welded, and the contact line or ridge 62 is raised with respect to the outer circumferential edge 63, usually a distance equal to about a quarter of the thickness of the tube-end wall. Where a #19 gage tube with a #14 gage insert is used, so that the total thickness is approximately one-eighth inch, I have found it suitable to raise the contact line 62 a distance of the order of 0.030 to 0.040 inch. In the desirable end-surface there is a constant clearance, measured in a vertical direction in the position of the tubes in Figs. 14 to 19 inclusive and 21, between the outer circumferential edge of the end-face and the surface of the cross tube.

I preferably derive a cutter-form empirically, by first forming a cutter-dummy having such form, and embody in that form one or more of several compromises and compensations.

In this connection it is to be understood that the problem is a practical one, and since in the welding step described below the parts are pressed together with a high pressure, the desired circumferentially complete initial line-contact will be secured even though the initial contact area is not shaped to exactly fit the part to which the tube end is to be welded, for the high portions will tend to be pressed down by the high pressure. Moreover, the purpose of the constant clearance is to permit the outer circumferential edge to fit against the surface of the cross tube, to give good appearance and avoid the presence of slight cracks between the two parts at the weld. Since good appearance permits considerable variation, and since high parts of the outer circumferential edge may be forged down during the welding operation and form a slight fillet or bead at the line of meeting of the tube surfaces, slight errors may also be present at the outer circumferential edge.

A suitable cutter form is shown in Fig. 20 where $w$ is the radius of the form or dummy 80, $x$ is the distance axially of the cross tube 64 from a zero point at the intersection of the axes of the two tubes, $R$ is the radius of the outer surface of the cross tube 64, $r$ is the radius of the inner surface of the tube end 61, $A$ is the angle between the tubes, and $t$ is the wall thickness of tube 61.

Figs. 22 to 29 illustrate a preferred method of making cutter-dummies 80 and 90 which have the shape of the cutters to be used. For these illustrations I have selected in one instance the case of a 90° joint such as that illustrated in Figs. 17 to 19, and in a second instance the case of a 70° joint such as that illustrated in Fig. 21, both between tubes of like diameter, and for convenience of description, I shall consider that such tubes are of one inch (1") outside diameter and that the wall thickness of the tube-end is one-eighth (⅛) inch.

In the case of the 90° joint, I first make a pattern 81 which has a cylindrical large end whose diameter is equal to the outside diameter of the tube-end 61, and a cylindrical small end with a diameter equal to the inside diameter of the tube-end 61, and cut both ends of such pattern with a cylindrical milling cutter which cuts on a radius equal to the radius of the outer surface of the cross tube 64. This gives at the small end of the pattern 81 a circumferential edge which has the shape of the intersection between the inside surface of the tube 61 and the outside surface of the tube 64, and on the large end an edge which has the shape of the intersection between the outside surfaces of the tubes 61 and 64.

Figure 26:
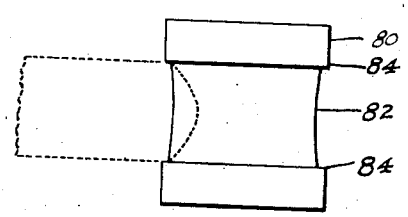
Figure 27:
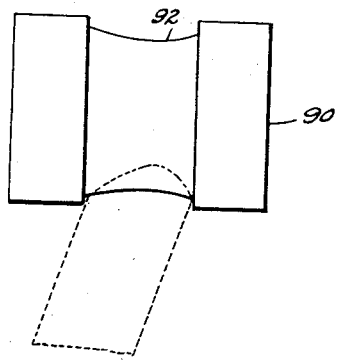
Figure 28:
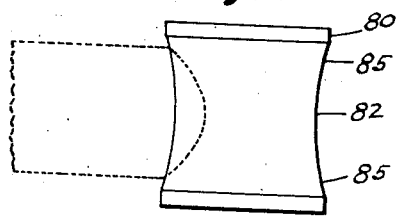
Figure 29:
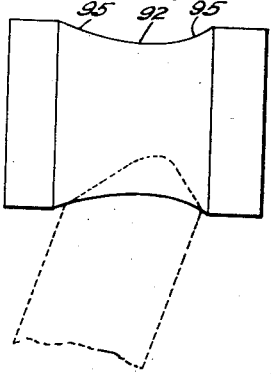

Then, as is illustrated in Fig. 26, I cut a bar of metal in a lathe until I have obtained a surface 82 which makes contact with the edge of the small end of the pattern 81. The smallest diameter of this surface is always greater than the diameter $2R$ (Fig. 20) of the cross tube 64, and its size determines in part the amount of clearance produced. I have found suitable in this case a smallest diameter of $1\frac{5}{32}$, or 1.156 inches.

The machining method of shaping tends to produce the greatest errors from the desired end-surface at the high sides of the shaped tube-end. To compensate at these high sides, as of the end-face 60 on the tube-end 61, I remove the feather edges 83 of the large end of the pattern 81 to lower the high sides and to secure a blunter and more rounded end-edge, as is shown in full lines in Figs. 22 and 23. The extent of this removal is determined by the shape of the surface 82 which has been cut by the use of the small end of the pattern 81, for I remove material from the pattern 81 at the feather edges 83 and from the cutter-dummy 80 mainly at the corners 84 (Fig. 26), until the circumferential edge of the large end of the pattern 81 and the surface of the cutter-dummy substantially fit each other. On the cutter-dummy, this involves primarily the removal of the corners 84 to form flanking surfaces 85, but it may slightly change the surface 82 at the sides thereof to secure smooth curves between the surface 82 and the flanking surfaces 85. In the present specific instance, I have found that the feather edges should be removed to a greatest radial depth of approximately $\frac{1}{32}$ of an inch.

By varying the smallest diameter of the cutter 80, which I assumed above to be 1.156 inches, I can secure more or less clearance between the circumferential edge 63 and the outer surface of the tube 64, this clearance being measured in the case of a right angle joint in a direction parallel to the axis of the tube-end 61. I desirably secure a clearance of approximately one-fourth ($\frac{1}{4}$) the thickness of the wall of the tube-end 61, which in this instance is approximately .030 or .040 inch.

In using a cutter shaped like the cutter dummy 80 just described, and to carry through to the tube-end 61 the compensation made by removing the feather edges 83, I preferably hold the tube-end being shaped in a pair of clamps 88, shown in Fig. 30, which over the greater part of their length fit the cylindrical outer surface of the tube-end 61, but which at their forward ends have an inner surface 89 which substantially conforms to the form produced in removing the feather edges 83. The clamps are cut away at the sides of the tube 61 to permit clearance for the cutter so that when they are applied to an un-shaped tube-end 87 they engage the outer surface of such tube-end 87 near its end only at diametrically opposite areas.

When these clamps are applied, the parts 89 bend the extreme end of the tube 87 to a somewhat elliptical shape which extends axially of the tube a relatively short distance, and desirably not beyond the bottom of the cut which is to be made. With the tube-end 87 thus held in the clamps 88, it is brought against the cutter (shown diagrammatically at 86), which forms an end surface such as the end surface 60 of Figs. 17 and 18.

Where desired, instead of using the clamps 88, I may cut an end surface on the tube-end without deforming it, and then grind off the feather edges produced, as by the use of a belt grinder.

The same general method which I have just described in the case of a 90° joint between tubes of the same size, may also be used where a joint is to be made at some other angle. For a 70° joint, such as is illustrated in Fig. 21, I have illustrated this in Figs. 24, 25, 27, and 29. Here I cut a pattern 91 in the same manner as before, but position the axis of the cylindrical cutter at an angle of 70° with the axis of the pattern 91. I then use the small end of the pattern 91 to form a surface 92 on a cutter-dummy 90, holding the pattern with its axis at approximately 70° to the axis of revolution of the cutter-dummy 90, as is shown in dotted lines in Fig. 27. This cuts a surface 92 which again follows the surface defined by Formula 1.

I remove the feather edges 83 of the large end of the pattern 91 in the same general manner as before, and use the edge of that large end to further form the cutter-dummy. In this instance, I have also found it suitable to use a smallest diameter of 1.156 inches.

In the instance of a joint at near a right angle between a 1½ inch cross-tube and a one inch tube-end, I find suitable a smallest diameter of $2\frac{3}{16}$ (or 2.188) inches.

The cutter-dummy described above for the 70° joint situation is used as a guide in making a cutter which will cut a surface like that of the cutter-dummy, and this cutter may be used to mill tube-ends for making joints such as that of Fig. 21. As in the previous instance, I prefer to use clamps corresponding to the clamps 88 to hold the tube-ends in slightly deformed condition during the milling operation, but I may cut such tube-ends without such deforming clamps and then grind off the feather edges produced.

The third and last main step of my process is welding. This is accomplished in a suitable resistance welding machine, which ordinarily must have associated with it some means for controlling the amount of welding current applied, and especially for accurately controlling the time of application of such welding current; for successful operation requires the use of relatively short times of current application, and consistent operation can be obtained only with reliable controls. Several mechanical and electrical arrangements for securing this desired time control are commercially available, and they need not be described here. Among them may be mentioned the "Thyratron" system of the General Electric Company, or the "Ignitron" system of the Westinghouse Electric Co.

In addition, one of the electrodes of the welding machine, conveniently the upper electrode, should be movable and have associated with it some means by which it can be pressed toward the fixed other electrode with a considerable pressure, applied in such a way that during the welding operation it will cause one of the parts being welded to immediately follow up the fusing of the metal, which initially separates such part from its final seat against the other part being welded, by movement toward such seat, and so that the pressure application will itself follow up this movement and be substantially constantly maintained between the parts being welded, to minimize flashing or arcing which may result from a failure to maintain constant contact between the parts. Such pressure may be obtained by using some yielding means such as springs in the mechanism by which the pressure is applied, and preferably disposing such springs in the pressure train close to the end thereof by which the pressure is applied to the parts being welded, to minimize the presence of parts whose inertia tends to delay the immediate follow-up action of the pressure. I call this pressure the "follow-up pressure".

Welding electrodes which may be used with a tube-end which has been shaped by upsetting to form lugs 22 are shown in Figs. 31 and 32, and electrodes which may be used with machined tube-ends such as the tube-end 61 of Figs. 17 and 18 are shown in Fig. 33.

In both such cases, the lower electrode is formed of a pair of jaws—30 and 31 in Figs. 31 and 32—suitably shaped to grip the tube-end, and to make a good electrical contact therewith over an area which extends around substantially its entire circumference and up closely to the peripheral edge of the end base-surface 23.

In the arrangement shown in Figs. 31 and 32, where the joint is to be made near the end of a tube which is large enough, I preferably use an upper electrode 34 which is provided with an electrode shoe 33 which will extend within the large tube. Welding electrodes of this general type may be used in welding joints with either upset tube-ends, as shown, or with machined tube-ends.

In the welding operation, as in the arrangement of Figs. 31 and 32, the tube-end is placed in the jaws 30 and 31, the larger tube 29 is slipped over the shoe 33 of the electrode 34, and such electrode 34 is brought down to press such tube 29 against the projecting end of the weld metal in the lugs 22. The contact area between such lugs 22 and the tube 29 is relatively small, and the sectional area of the metal of the lugs transversely of the current path increases progressively with the distance along such current path away from such contact area, so that the greatest restriction in the path of the welding current is substantially at that contact area. The pressure with which the parts are pressed together will be concentrated at the contact area and will assist in obtaining complete contact over the desired contact area by pressing out irregularities at the contact area. With the parts thus pressed together, a high welding current of short duration is passed across the electrodes, to cause practically instantaneous welding action between the two parts.

In obtaining the most desirable results by my method of making joints, the welding action occurs so rapidly that I have not been able to determine directly what happens. Extended experiments with my method, however, lead me to believe that the welding action may be explained as follows.

I find it desirable to use a large amount of current because, as I believe, it should be sufficient to instantaneously fuse the metal at the contact area, particularly the gathered metal on the base-surface of the end conformation. Simultaneously with the fusing, the two parts are immediately moved together by the follow-up pressure, so that there is continuous contact between them, which minimizes arcing. As the parts move together, an increasingly greater cross-sectional area of the gathered weld-metal separating the base-surface of the tube-end from the surface of the cross-tube is brought to the contact area between such parts. This increases the mechanical resistance to the movement caused by the follow-up pressure and decreases the electrical resistance at the contact area and thus decreases the heating effect; so that after the start of the fusing there are two forces co-operating to slow the movement of the parts toward each other—i. e. an increase in mechanical resistance, and a decrease in the heating effect. Moreover, the current is on for but a fraction of a second, and it is desirably interrupted before the base-surface of the tube-end comes flush with the surface to which welding is being done, for heat is generated so rapidly at first that heating need not continue throughout the movement of the parts.

The aforesaid progressive increase of the cross-sectional area of the gathered metal on the tube-end serves also to prevent the puncturing of the wall of the part to which welding is being done, to avoid simply pushing the tube-end through such wall instead of forming a weld therewith, as has occurred in prior attempts to form welded joints between a tube-end and the side of another tube. As a result, good joints may be formed without supporting the wall of the cross-tube, although cross-tube inserts may be used to give structural strength to the joint.

As will be seen from the foregoing explanation of what I believe happens during welding, the amount of welding current used and the time of its application are interrelated with the size and end-conformation of the tube-end, the follow-up pressure, and the method of its application, and may vary with the type of welding machine used. Where the tube-end has a one inch outside diameter, the follow-up pressure may be two to four thousand pounds and the current may be of the order of from one hundred to several hundred K. V. A. applied at a voltage of less than about eight volts for a period from one-half (½) cycle of a sixty cycle current to a half a second. Generally, the amount of current used will vary inversely with the time of its application. The desirable conditions for any particular joint welding operation may be determined by suitable experiments in the light of the principles and explanation of the action as herein set forth, and will be indicated by the examples hereinafter described.

As has been mentioned, a joint such as that illustrated in Figs. 14, 15, and 16, between a tube-end 50 which has been shaped by machining, and a larger cross-tube 54, may be welded in electrodes similar to those of Figs. 31 and 32. In this case, the tube end 50 is held in the jaws 30 and 31 of the lower electrode, which will desirably fit against the sides of the tube up to within about $\frac{1}{8}$ inch from the outer edge 52, to carry the current to the tube-end close to the part to be welded. Desirably also, this distance from the edge 52 to the top edges of the jaws will be the same all around the tube, to avoid a greater flow of current at one circumferential portion than at another. The upper electrode 34 is then brought down to press the tube 54 against the tube end 50 in the relationship shown in Fig. 15. The two parts will engage each other with substantially a line contact that coincides with the inner edge or rim 51 of the tube end 50, and there will be a clearance of about .030 or .040 inch between the outer edge 52 of such tube end 50 and the cross tube 54. Welding is then done in the manner already described, to form a joint having the appearance illustrated in Fig. 16, and in which the parts are welded together around the entire circumference of the tube-end 50.

In a proper joint made by this process, the outer surface of the tube-end will extend smoothly substantially to the surface of the cross-tube, and the weld will be substantially co-extensive with the end base-surface of such tube-end.

Figs. 17, 18, 19, and 33 illustrate the formation of a joint between tubes of like diameter, with the tube-end 61 shaped by machining and with the cross-tube 64 reinforced by my preferred method. Figs. 17 and 18 show the relative positions of the two tubes before welding occurs, and how the surface of the cross-tube 64 is engaged by the shaped end face 60 of the tube-end 61 at its inner circumferential edge or rim 62, to form substantially a line contact therewith; and (in somewhat exaggerated scale) how the outer edge 63 of such tube-end is spaced from such surface of the cross tube 64. Fig. 33 shows a set of electrodes suitable for use in welding joints such as are illustrated in Figs. 17 to 19, between tubes of similar diameter. As in the modification of Fig. 32, the lower electrode 45 is conveniently formed as a pair of electrically interconnected jaws, which are shaped to grip the tube-end 61 and make good electrical contact therewith over an area which extends upwardly close to the edge of the end-face and is spaced from such edge a substantially equal distance all around the tube-end. The upper electrode 48 is formed to closely fit the cross tube 64 and engage it over an area which extends near to the place where welding will occur.

In this case also, welding is done by the use of a practically instantaneous current of high amperage, generally in the manner already described.

In welding with machined tube-ends, as for instance with that of Figs. 17, 18, and 19, my experience indicates that the relatively wide-angle wedge shape of the gathered metal on the base surface of the tube-end 61, as shown in section at the right in Figs. 17 and 18, with the line-contact between the two parts under pressure, places the greatest resistance in the current path at that line contact, so that the initial flow of current instantaneously generates a large quantity of heat at that line contact. This high heat fuses the metal at the line of contact, especially that of the rim 62 rather than that of the cross-tube; and the follow-up pressure forges the metal of the parts together. Since as this occurs, the cross-sectional area of the metal at the weld increases rapidly, because of the considerably greater body of metal toward the base of the wedge-shaped metal; and since the time of current application is extremely short; the greater body of metal toward and at the base of the wedge is heated relatively less, and the movement of the two parts toward each other is stopped before the outer edge 63 at the base of the wedge-shaped metal is materially disturbed. Moreover, the location of the rim 62 of the wedge toward the inside of the tube-end, so that the heating occurs mainly at that location, tends to avoid any outward extrusion of weld- or flash-material during the forging, so that it is unnecessary to remove such material around the outer edge 63 of the tube-end after the welding is completed. This same condition tends to avoid overheating of the outside surfaces contiguous to the joint, and thus tends to avoid marring of such surfaces and the necessity for finishing operations subsequent to the welding.

The protection of the outer surface of the tube-end seems to be materially aided in the reinforced tube-ends, which I preferably use, especially where such tube-end is shaped by machining, by the fact that the contact-area where the greatest part of the welding heat is generated is formed by the metal of the insert, for the flow of heat from such insert to the outer tube is partially impeded by the slight air spaces at the bases of the knurls or other projections on the surface of the insert.

I give below some examples of the use of my process in making joints:

*Example 1. Joints between reinforced one-inch tubes*

In a #19 gage mild-steel tube of 1 1/16" outside diameter, I inserted reinforcing inserts 4 1/2" long and made from #16 gage tubing of .950" outside diameter with a 1/16" commercial diamond-shaped knurl cut in its outside surface. With these inserts held in place, the tube was swaged to 1" outside diameter. This embedded the projecting points of the knurling on the reinforcing inserts in the inside surface of the outer tube, and securely fastened the inserts in place. The tube was then cut transversely through the centers of some of the inserts. The tube-ends produced by this cutting were then machined with a milling cutter shaped like the cutter-dummy 80 shown in Fig. 28 to produce end faces on such tube-ends like that shown in Figs. 17 and 18. Several joints were then made from these shaped tube-ends. In this operation, (which I shall describe with reference to Figs. 17, 18, 19, and 33 for clarity), a tube-end 61 was placed in the jaws of the lower-electrode 45 and a cross-tube 64 was laid across the shaped tube-end 61 with the reinforcing insert of the tube 64 overlying such shaped tube-end, and the upper electrode 48 was brought down against such cross-tube 64.

The cross-tube 64 was at right angles to the tube-end 61 and engaged the end face 60 at its raised inner edge or rim 62, and its surface lay about 0.030 or 0.040 of an inch axially of the tube-end 61 away from the outer peripheral edge 63 of such end face 60.

In the welding machine used, the upper electrode 48 was arranged to be pressed down with a force of about 2,000 pounds and this force was caused to be substantially constantly applied by the reaction of a stressed yielding element such as a group of springs. This high pressure tended to reduce any high spots on the rim 62 or on the cross-tube 64 and to cause complete contact around such rim 62.

In making the several joints, I varied the current characteristics and the time of current application, but kept other conditions approximately the same. The data on some of these operations, as nearly as it could be determined, is tabulated below:

| Time in cycles of 60 cycle current | Primary | | Secondary | | K. v. a. |
|---|---|---|---|---|---|
| | Current $I_p$ | Voltage $E_p$ | Current $I_s$ | Voltage $E_s$ | |
| 8 1/2 | 595 | 196 | 40,500 | 2.88 | 116 |
| 8 1/2 | 825 | 189 | 46,000 | 3.26 | 156 |
| 7 | 1,020 | 180 | 53,000 | 3.46 | 184 |
| 7 | 910 | 186 | 50,000 | 3.4 | 169 |
| 6 | 1,150 | 176 | 56,000 | 3.59 | 202 |
| 5 | 895 | 297 | 60,000 | 4.36 | 266 |
| 4 | 895 | 297 | 60,000 | 4.36 | 266 |
| 3 | 990 | 294 | 64,000 | 4.52 | 291 |
| 2 | 1,530 | 271 | 79,500 | 5.2 | 415 |
| 1 1/2 | 1,190 | 396 | 80,000 | 5.83 | 470 |

The joints produced in this series of operations were all good joints, but those formed with the shorter time had a somewhat better appearance than those made with the longer periods of current application. With the longer periods of current application the surface of the joint had a more discolored appearance, and a slight fillet or bead was formed at the line of meeting of the outside surfaces of the two tubes.

In joints such as those of Example 1, where the cross-tube is reinforced, and where an inner electrode can be used, the weld may extend to the insert in such cross-tube, and form a joint in which the two inserts and the two tubes are all welded together, for the current is then applied more directly to the insert in the cross-tube.

*Example 2. One-inch tube shaped by upsetting to one and one-half inch tube*

A reinforced tube was formed, and cut to produce tube-ends, as in Example 1. A tube-end so produced was then put in a pair of jaws like those of Figs. 2 and 3, with about 1/16 inch of tubing above the upper surface of such jaws, and with the two slots in the insert substantially in an axial plane perpendicular to the axial plane of two lug-forming cavities of the upper electrode-die. The upper electrode-die was then brought down against the end of the tube and pressed thereagainst with a force of about 4000 pounds. An alternating welding current of approximately 115 k. v. a., from a 150 k. v. a. machine, was then passed across the electrodes during a period of about a half a second. This current heated the metal at the end of the tube and softened it sufficiently to permit the pressure on the upper die to close the dies and to forge the end of the tube to the form of the die-cavities, which were shaped to produce a tube-end like that of Figs. 5 and 6.

The tube was then removed, and placed in the jaws 30 and 31 of a welding electrode such as that shown in Figs. 31 and 32. A larger tube of #11 gage, 1½ inches outside diameter was then slipped over the shoe 33 of the upper electrode 34, and such electrode brought down to press the two parts together with a force of 4000 pounds. A welding current of the same characteristics as in the upsetting operation was then passed across the electrodes for a similar period of time, to fuse the lugs on the tube-end and permit the two pieces to seat against each other, and to weld them together in the vicinity of the lugs.

In the preceding description, I have described the application of my invention with mild-steel tubing; but it is also applicable for use with tubing of many other metals. Some metals which have hitherto been extremely difficult to weld may be welded in my process; and with tubing of any metal which may be so welded, only such modification as is necessary to accommodate the welding characteristics of the particular metal will be required.

With tubing of materials which are difficult to resistance weld by my process, or even impossible to so weld, as for example some grades of high-carbon or alloy steels, my invention may still be used; for reinforcing inserts selected for welding characteristics may be firmly joined to the tubing and such inserts can then be welded to a cross-tube.

It is possible with my invention, therefore, to form structural elements of tubing selected mainly for its appearance or its structural qualities and only incidentally for its welding characteristics, and fabricate articles with such elements by the use of reinforcing inserts selected for their good welding qualities.

An instance which approaches this condition is present in the use of some grades of stainless steel tubing. In such case, I may use reinforcing inserts 11 of mild steel, and where the stainless steel tubing is harder than the insert, I case-harden such inserts as by cyaniding, before placing them in the harder tubing. This hardens the points 12 on the insert so that when the tube is reduced to proper size, the points 12 will embed themselves in the outer tube.

I give below an example of the use of my invention with stainless steel tubing where the two tubes to be joined are of the same size.

Example 3

Reinforcing inserts of mild steel tubing, .950 inch in diameter and 4½ inches long, and knurled on their outer surface with $\frac{1}{16}$ inch commercial diamond shaped knurling were cyanided to harden the knurl points. These inserts were then placed in a commercial "18–8" stainless steel tube of $1\frac{1}{16}$ inches outside diameter, and the tube was reduced to one inch outside diameter, to embed the knurling in the stainless steel and firmly join the tube and the inserts. The tube was then cut at about the center of one of the inserts.

A tube-end so produced was then shaped by upsetting, by placing it between die-electrodes shaped to form an end face like that of Fig. 11, in a 150 k. v. a. welding machine, and upsetting it in the manner set forth in Example 2, by the use of approximately 15 cycles of a 60 cycle current and the full k. v. a. of the machine.

This produced a finished tube-end shaped like that shown in Fig. 11; which was then used with another reinforced section of the same tubing to form the welded joint shown in Figs. 9 and 10.

In making such welded joint, the electrodes used were generally like those of Fig. 33, and the welding current was approximately the same as that used in the upsetting operation. The welding occurred mainly in the vicinity of the two lugs 22, and the penetration of the weld at these points was sufficient to weld the reinforcement in the cross-tube to such tube and thus connect the two tubes and the two reinforcements together.

Other similarly produced tube-ends of stainless steel with stainless steel inserts were shaped by machining, as in Example 1; and joints were made between them and other stainless steel tubes. In such operations I used the conditions set forth in Example 1, but with the shorter times of current application and about twice as much follow-up pressure. The stainless steel joints made from machined tube-ends using these conditions were more desirable than those made from the tube-ends shaped by upsetting, especially because there was less discoloration of the stainless steel surfaces, and because the use of the shorter times of current application minimizes changes in the grain and strength structure by heating.

Microscopic examination of the above described welds made by the foregoing process indicate that the welding has taken place at the surface portions of the opposed metal parts and has been confined to substantially the surface portions of those parts, and, furthermore, that the "heat lines", i. e., the lines between grains which have been affected and those which have not been affected by the welding temperature, are located in the body of the two pieces of metal a distance of a few hundredths of an inch, for example, $\frac{3}{100}$ to $\frac{5}{100}$ of an inch from the opposed surfaces. Thus the weld is definitely a "surface" weld as the term is known and recognized in the art, and having been made by resistance welding is a "resistance surface weld."

The term "annular" as used in this specification and claims in relation to the end surface of one tubular member, is intended to mean and include a closed figure, such as a circle, rectangle or polygon.

From the foregoing, it will be apparent that by my invention resistance welded joints may be formed directly between a tube-end and the surface of another part, particularly the side of another tube without the necessity for preliminary operations on such other part or tube; that the joints produced are strong and resilient, and are made without the formation of objectionable flash-material around the edges of the joint so that the necessity for finishing operations is substantially eliminated; and that my invention makes it possible to form such joints between tubes which have hitherto been difficult or impossible to weld into joints.

The method of forming a joint in which the tube end is shaped by forging, and that in which the contact area of the tubular end is discontinuous, although covered by the broad claims of this application, are specifically claimed in my copending application Serial No. 1,102, filed January 10, 1935, for Tubular construction.

I claim as my invention:—

1. The method of forming a joint between a metal tube-end and another tube, which comprises shaping the tube-end to provide circumferentially thereof an initial small contact area with a side of the other tube, a full body of metal closely behind said contact area, and a small space between non-contacting portions of the opposed surfaces of said tubes, strongly pressing said tubes together and passing a welding current between them, said pressure and current being interrelated whereby, practically instantaneously the metal of the tube-end at the contact area will be fused by the current and forged by the pressure to bring said full body of metal and the initially non-contacting surfaces of said tube end to the side surface of said other tube, and the tubes will be welded together.

2. The method of forming a joint between a metal member having a tubular end and another metal part, which comprises forming on said tubular end an end-surface having two radially spaced circumferentially extending edges both shaped to substantially fit a surface of the other part but with the inner edge disposed to initially engage said surface and space the outer edge from said surface a distance equal to a fraction of the distance between said edges, pressing said parts together with welding pressure, and passing a practically instantaneous welding current between said parts while so pressed together, said pressure and current being interrelated whereby the parts will follow up the fusing of the metal at the initial contact by movement together and bring said outer edge to the said surface of the other part, and weld the member and part together.

3. The method of forming a joint between a member having a tubular end and another metal part, which comprises forming on said end a ridge adapted to initially engage a surface of said part over a narrow contact area extending circumferentially of said end, while maintaining a small space between non-contacting portions of the opposed surfaces of said end and said other part, pressing said parts together in such initial engagement with welding pressure, and passing a welding current between the parts while so pressed together in sufficient amount practically instantaneously to fuse said ridges, the application of said pressure being arranged to follow up said fusing so quickly as to bring the surfaces of the said tubular end and said other part into substantially full contact and to form a weld between surfaces thereof before further fusion takes place.

4. The method of forming a joint between a metal member having a tubular end and another metal member, which comprises forming on said end a ridge adapted initially to engage a surface of the other member over a narrow contact area extending circumferentially of said end while maintaining a small space between the adjacent surfaces of said end and said other member, pressing said parts together in such initial engagement with welding pressure, and passing a welding current between the parts while so pressed together in sufficient amount, practically instantaneously, to heat said ridge to welding temperature, the application of said pressure being arranged to follow up said heating so quickly as to bring the opposed surfaces of the said tubular end and said other member into substantially full contact and, before further heating takes place, to form a weld between said members.

5. The method of welding the end of a metal tube to another metal part, which comprises providing the end of the tube with a hollow reinforcement having projections on its surface, firmly engaging the ends of said projections with the surface of the tube to form a good physical and electrical interconnection therebetween, shaping the reinforced tube-end to provide a circumferentially extending contact area on the end of a reinforcement for initially engaging said surface of the other part, passing a welding current between said parts while pressed together in engagement over said contact area, and controlling such current and pressure so as practically instantaneously to form a surface weld between said tube and said part.

6. In the formation of a resistance-welded joint between a tube-end and a cross tube, the steps of milling the tube-end with a milling cutter having a smallest diameter greater than the diameter of the cross tube and shaped to cut on said tube-end an end-face whose inner edge will make substantial line-contact with said cross tube while the outer edge is spaced apart from the cross tube a small distance when the tubes are assembled for welding, and electrically heating the said contacting surfaces of said tubes while so assembled and welding them together with substantially the full face of the tube end in engagement with the cross tube to effect a surface weld.

7. The method of joining together members, composed of metal capable of being heated to welding temperature by electrical resistance, which includes the steps of bringing a narrow, annular portion of the end surface of a tubular member of such metal into substantially continuous contact in a plurality of planes with a side surface of another tubular member of such metal while maintaining a small, annular, wedge-shaped space between said opposed surfaces and adjacent to said annular portion, and, while pressing said thus positioned members together with welding pressure, passing welding current thru the contacting portions of said members, and welding said members together thruout substantially the full extent of the said end surface with a resistance surface weld.

8. The method of joining together members, composed of metal capable of being heated to welding temperature by electrical resistance, which includes the steps of thickening the wall of a tubular member of such metal at its end, bringing a narrow, annular portion of the end surface of said tubular member into substantially continuous contact in a plurality of planes with the side surface of another tubular member of such metal while maintaining a small, annular, wedge-shaped space between said opposed surfaces and adjacent to said annular portion, establishing electrode contact thruout substantially the entire outer periphery of the tubular member, and, while pressing said thus positioned members together with welding pressure, passing welding current thru the contacting portions of said members, and welding said members together thruout substantially the full annular extent of the said end surface.

9. The method of joining together members, composed of metal capable of being heated to welding temperature by electrical resistance, which includes the steps of assembling a tubular article in the end of another tubular article, one of which is composed of such metal, and establishing mechanical and electrical contact between such articles to form a reinforced tubular member, bringing a narrow, annular portion of the end surface of said reinforced tubular member into substantially continuous contact in a plurality of planes with a side surface of another tubular member of such metal while maintaining a small, annular, wedge-shaped space between said opposed surfaces and adjacent to said annular portion, establishing electrode contact thruout substantially the entire outer periphery of the tubular member, and, while pressing said thus positioned members together with welding pressure, passing welding current thru the contacting portions of said members, and welding said members together thruout substantially the full annular extent of the said end surface.

10. The method of joining together members composed of metal capable of being heated to welding temperature by electrical resistance and one of which is tubular, which includes the steps of shaping a surface of one of the said members so that when said members are assembled in end-to-side welding position the opposed surfaces of the said members will have a substantially continuous narrow annular contact lying in a plurality of planes and will define a small, annular, wedge-shaped space adjacent to such contact, assembling the said members in welding position, establishing encircling axial electrode contact with the side surface of the tubular member and electrical conducting contact with the other member, and substantially closing the said space and welding the opposed surfaces together by exerting welding pressure at said electrode contacts and by passing a large welding current thru the contacting portion of said members for a relatively short period of time.

11. The method of joining together members, composed of metal capable of being heated to welding temperature by electrical resistance, which includes the steps of bringing the end surface of a tubular member of such metal into substantially continuous annular contact of less width than the thickness of said member with the side surface of another tubular member of such metal, and, while pressing said thus positioned members together with welding pressure, passing a high welding current of short duration thru the contacting portions of said members, thereby welding said members together thruout substantially the full annular extent of the said end surface with a resistance surface weld.

12. The method of joining together members composed of metal capable of being heated to welding temperature by electrical resistance, which includes the steps of bringing the annular end surface of a member having a tubular end into substantially continuous annular contact, of less width than the wall thickness of said tubular end, with the side surface of another member of such metal while maintaining a small space between non-contacting portions of the opposed surfaces of said members adjacent to the said contact, and, while pressing said thus positioned members together with welding pressure, passing a high welding current of short duration thru the contacting portions of said members and, practically instantaneously, highly heating said contacting portions, moving the members toward each other to bring the opposed, initially non-contacting surfaces into engagement with each other, and welding said members together thruout substantially the full annular extent of the said end surface.

13. The method of forming a resistance surface weld between two tubular members composed of metal capable of being heated to welding temperature by electrical resistance which includes the steps of so shaping the end surface of one member, that when assembled with the side surface of the other member, the two members will contact over a narrow substantially continuous annular area and in a plurality of different planes, bringing the members into assembled position with the said end surface of one member in said annular contact with the side of the other member and with a small annular wedge shaped space between the members adjacent to said contact area, and while pressing said thus positioned members together with welding pressure, passing a high current of short duration through the contacting portions of the members and then interrupting the flow of current before excess metal or flash has been formed.

14. The method of joining together two tubular members, composed of metal capable of being heated to welding temperature by electrical resistance, which includes the steps of shaping the end of one of said members so that portions thereof lie in several different planes and so that when the members are brought into end to side assembled position the said end surface of one member will contact with the curved side surface of the other member over a narrow annular substantially continuous area parts of which lie in different planes, bringing the members into such assembled position, joining them together by a resistance surface weld extending throughout the substantially full extent of said end surface by simultaneously pressing said members together with welding pressure and passing a high welding current through the contacting portions thereof for a short period of time.

15. The method of making a joint between the end of a tube and another member, said members being composed of metal capable of being heated to welding temperature by electrical resistance, which includes the steps of thickening the end of the tube and shaping the end surface thereof to provide a circumferentially extending contact area, smaller than the total end area of the tube, for initially engaging a surface of the other member and for spacing other portions of said end surfaces apart from the other member a distance less than the thickness of the wall of said tube, passing a high welding current for a short period of time between said members while they are pressed together with welding pressure in engagement over said contact area, the pressure and the amount and duration of the current being so controlled and correlated that, practically instantaneously, the contacting surfaces of the members will be heated to welding temperature, and the parts will move toward each other and bring the opposed surfaces into substantially complete contact with each other, and a surface weld will be formed between said members.

16. The method of forming a finished joint between members composed of metal capable of being heated to welding temperature by electric resistance, which includes the steps of opposing the surface of a member of such metal to the end of a member of such metal having an annular end surface with two radially spaced circumferentially extending edges, bringing said members into contact with each other at one of said edges with the other edge being spaced from said surface by a distance less than the distance between said edges, pressing said members together with welding pressure and passing a practically instantaneous welding current between said members while so pressed together, the pressure and the amount and duration of the current being so controlled and correlated that, practically instantaneously, the contacting surfaces of the members will be heated to welding temperature, the parts will move toward each other and bring the opposed surfaces into substantially complete contact with each other, and a surface weld will be formed between said members.

17. The method of forming a joint between members composed of metal capable of being heated to welding temperature by electric resistance, which includes the steps of opposing the surface of a member of such metal to the beveled annular end of another member of such metal, bringing said members into contact with each other at one edge of the bevel with another edge of the bevel being spaced from said surface by a distance less than the wall thickness of the beveled end, pressing said members together with welding pressure and passing a practically instantaneous welding current between said members while so pressed together, the pressure and the amount and duration of the current being so controlled and correlated that, practically instantaneously, the contacting surfaces of the members will be heated to welding temperature, the parts will move toward each other and bring the opposed surfaces into substantially complete contact with each other, and a surface weld will be formed between a major part of the opposed surfaces.

18. The method of making a joint between the end of a metallic tube and another member composed of metal capable of being heated to welding temperature by electrical resistance, which includes the steps of providing the end of the tube with a hollow reinforcement of such metal and having a good physical and electrical interconnection therewith, shaping the reinforced tube end to provide a circumferentially extending contact area on the end of said reinforcement for initially engaging a surface of the other member and for spacing other end portions of the tube and its reinforcement apart from the other member a distance less than the wall thickness of the said tube, passing a high welding current for a short period of time between said reinforced tube and said other member while they are pressed together with welding pressure in engagement over said contact area, the pressure and the amount and duration of the current being so controlled and correlated that, practically instantaneously, the contacting surfaces of the members will be heated to welding temperature, the parts will move toward each other and bring the opposed surfaces into substantially complete contact with each other, and a surface weld will be formed between said members.

19. The method of making a joint between two members composed of metal capable of being heated to welding temperature by electrical resistance, one of which members has a tubular end, which includes the steps of shaping the end surface of the member having a tubular end so that when circumferentially extending parts of it contact with the other member other parts of said surface will be spaced from the other member by a small distance, so assembling the members, subjecting them to welding current and pressure, and, practically instantaneously, heating the contacting surfaces to welding temperature, moving the parts towards each other to bring the opposed non-contacting surfaces into engagement with each other, and welding the end surface of the member having a tubular end to the other member to effect a surface weld.

20. The method of making a joint between two members composed of metal capable of being heated to welding temperature by electrical resistance, one of which members has a tubular end, which includes the steps of shaping the end surface of the member having a tubular end so that, when circumferentially extending parts of it contact with the other member, other parts of said surface will be spaced from the other member by a small distance, so assembling the members, subjecting them to welding current and pressure, and practically instantaneously, heating the contacting surfaces to welding temperature, moving the parts towards each other to bring the opposed non-contacting surfaces into engagement with each other, and welding the end surface of the member having a tubular end to the other member to effect a surface weld between at least about one-half of the opposed surfaces.

KENNETH V. HART.

CERTIFICATE OF CORRECTION.

Patent No. 2,091,982. September 7, 1937.

KENNETH V. HART.

It is hereby certified that error appears in the printed specification of the above numbered patent requiring correction as follows: Page 5, first column, line 72, strike out the words "by Formula 1"; Page 9, first column, line 12, claim 1, after "another" insert metal; line 21, same claim, insert a comma after "instantaneously"; line 48, claim 3, before "member" insert metal; line 59, same claim, for "ridges" read ridge; and second column, line 19, claim 5, for "a" read said; and line 20, for "said" read a; page 10, first column, line 55, claim 11, before "thickness" insert wall; and that the said Letters Patent should be read with these corrections therein that the same may conform to the record of the case in the Patent Office.

Signed and sealed this 19th day of October, A. D. 1937.

Henry Van Arsdale.

(Seal) Acting Commissioner of Patents.